United States Patent
Van Goor et al.

(10) Patent No.: US 9,554,436 B2
(45) Date of Patent: Jan. 24, 2017

(54) POWER SUPPLY FOR LED LIGHTING SYSTEM

(71) Applicant: PHILIPS LIGHTING HOLDING B.V., Eindhoven (NL)

(72) Inventors: Dave Willem Van Goor, Nederweert Eind (NL); Lennart Yseboodt, Retie (BE)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 14/905,180

(22) PCT Filed: Jul. 16, 2014

(86) PCT No.: PCT/EP2014/065192
§ 371 (c)(1),
(2) Date: Jan. 14, 2016

(87) PCT Pub. No.: WO2015/010972
PCT Pub. Date: Jan. 29, 2015

(65) Prior Publication Data
US 2016/0157304 A1   Jun. 2, 2016

(30) Foreign Application Priority Data

Jul. 24, 2013   (EP) .................................. 13177721

(51) Int. Cl.
H05B 33/08   (2006.01)
(52) U.S. Cl.
CPC ........ H05B 33/083 (2013.01); H05B 33/0815 (2013.01); H05B 33/0827 (2013.01); H05B 33/0839 (2013.01)

(58) Field of Classification Search
None
See application file for complete search history.

(56) References Cited

U.S. PATENT DOCUMENTS

| | | |
|---|---|---|
| 2004/0037080 A1 | 2/2004 | Luk |
| 2004/0056774 A1 | 3/2004 | Schleicher |
| 2008/0074061 A1 | 3/2008 | Chen et al. |
| 2009/0079359 A1 | 3/2009 | Shteynberg et al. |
| 2011/0006696 A1 | 1/2011 | Menegazzi et al. |

(Continued)

FOREIGN PATENT DOCUMENTS

| | | |
|---|---|---|
| EP | 1750486 A1 | 2/2007 |
| EP | 2239997 A1 | 10/2010 |

(Continued)

*Primary Examiner* — Jany Richardson

(57) ABSTRACT

Embodiments relate to a LED lighting system comprising a power supply circuit for supplying a power supply current to a LED strip (200). The power supply circuit (100) includes input terminals (K1, K2) for receiving a power voltage from a power supply voltage, output terminals (K3, K4) connected to the input terminals of the LED strip (200), a sensing module (106) coupled between the output terminals (K3, K4) for measuring an impedance of the LED strip (200). The sensing module is adapted to drive a switch (104) and to transmit a measured impedance value to a driver module (108). The driver module (108) is adapted to generate the power supply current depending on the length of the LED strip (200), as reflected by the measured impedance value.

8 Claims, 2 Drawing Sheets

(56) References Cited

U.S. PATENT DOCUMENTS

| | | | |
|---|---|---|---|
| 2013/0009546 A1* | 1/2013 | Hollander | F21V 29/004 |
| | | | 315/113 |
| 2013/0154489 A1* | 6/2013 | Chang | H05B 37/02 |
| | | | 315/192 |
| 2014/0167632 A1* | 6/2014 | Pijlman | H05B 33/0806 |
| | | | 315/192 |
| 2015/0022107 A1* | 1/2015 | De Bruycker | H05B 33/0851 |
| | | | 315/200 R |
| 2016/0227630 A1* | 8/2016 | Wendt | G06F 1/266 |

FOREIGN PATENT DOCUMENTS

| | | | |
|---|---|---|---|
| GB | 2478489 | A | 7/2011 |
| WO | 0148495 | A1 | 7/2001 |
| WO | 2007093927 | A1 | 8/2007 |
| WO | 2010092504 | A1 | 8/2010 |
| WO | 2010109366 | a1 | 9/2010 |
| WO | 2011110981 | A2 | 9/2011 |
| WO | 2013011422 | A1 | 1/2013 |
| WO | 2013064973 | A1 | 5/2013 |
| WO | 2013144745 | A1 | 10/2013 |
| WO | 2013168042 | A1 | 11/2013 |

\* cited by examiner

POWER SUPPLY FOR LED LIGHTING SYSTEM

CROSS-REFERENCE TO PRIOR APPLICATIONS

This application is the U.S. National Phase application under 35 U.S.C. §371 of International Application No. PCT/EP2014/065192, filed on Jul. 16, 2014, which claims the benefit of European Patent Application No. EP 13177721.1, filed on Jul. 24, 2013. These applications are hereby incorporated by reference herein.

BACKGROUND

Technical Field

The present invention generally relates to techniques of supplying power to a Light-Emitting Diode (LED) lighting system, and more particularly to methods and devices for automatically controlling a supply current used for powering such a system.

Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Since they have a high efficiency and long life, LED lighting systems are increasingly used in many applications such as domestic lighting, for instance. In many lighting systems, LEDs also offer a higher optical efficiency than any other light source. As a consequence, LEDs represent an interesting alternative to the well known light sources such as fluorescent lamps, high intensity discharge lamps or incandescent lamps.

LED lighting systems known in the art may comprise a power supply module for supplying power to a luminaire which may comprise a plurality of LED components inside a flexible slab, for example made of silicone, also known as a thin flexible luminaire.

A local current control unit may be provided inside the LED luminaire itself. A disadvantage exists, however, for instance when the LED luminaire is a cut-table luminaire, because such solution does not allow taking into consideration the various specifications of any specific application in which the LED luminaire may be used, in particular the actual length of the slab once cut to fit the requirements of the application. Further, using current controllers inside the flexible luminaire for each LED module would increase the manufacturing cost.

A solution allowing decreasing the process cost associated with a thin flexible luminaire can consist of using a current controller that is external to the LED luminaire. A main disadvantage of this solution, however, is that the LED luminaire cannot be a cut-table LEDs luminaire, because the outside current source would then have a fixed current adapted to power the original, i.e. longest length of the LED slab.

SUMMARY

The present invention aims at providing an alternative solution for supplying lighting systems of the cut-table type that is both less complex and cheaper to manufacture.

According to a first aspect, there is proposed a LED lighting system comprising:

a LED strip comprising a plurality of LED modules connected in parallel, each LED module comprising:
  a LED string structure comprising a plurality of LED components connected in series,
  an impedance module connected in parallel with the LED string structure,
a driver module having an output adapted to provide a power supply current for supplying the LED strip,
a switch, having a first terminal coupled to the driver module and a second terminal coupled to the LED strip,
a sensing module adapted to control the switch, and to measure a total impedance of the LED strip when the switch is open, and having an output adapted to provide an output signal representative of the total impedance of the LED strip, wherein the driver module further has an input adapted to receive the output signal from the sensing module, and is adapted to control the power supply current by the output of the driver module as a function of the output signal provided by the output of the sensing module.

In an exemplary embodiment of the invention, the LED components can be arranged on a flexible slab.

In an exemplary embodiment of the invention, the flexible slab can be made of silicone.

In an exemplary embodiment of the invention, the impedance module can comprise at least one resistive element.

In an exemplary embodiment of the invention, the impedance module can comprise at least one element among the group consisting of a resistor, a capacitor or an inductor.

The proposed solution as defined above allows controlling the power supply current of the LED strip with a single driver module, which is external to the LED strip. Thus, the power supply current can be regulated by the driver module depending on the length of the LED string. This further allows decreasing the density of circuitry inside the LED strip, and thereby its manufacturing cost. Further, the use of only low-cost components such as LEDs and resistors inside the silicone slab allows decreasing the manufacturing cost of the LED lighting system.

In a second aspect, there is proposed a method of supplying power to a LED lighting system comprising a plurality of LED modules connected in parallel forming a LED strip, comprising at least:

a step of cutting the LED strip to a desired length,
a measurement step allowing measuring the total impedance of the LED strip,
a regulation step allowing providing a power supply current to the LED strip as a function of the total impedance measured during the measurement step, the total impedance being dependent on the desired length.

In an exemplary embodiment of the invention, the switch can be set by the sensing module in an open state during the measurement step.

In an exemplary embodiment, the switch can be set by the sensing module in a closed state during the step of controlling.

The proposed method as defined above allows setting the switch module in the open state or in the closed state by the sensing module during steps of measuring and controlling.

BRIEF DESCRIPTION OF THE DRAWINGS

Embodiments of the present invention are illustrated by way of example, and not by way of limitation, in the figures of the accompanying drawings, in which like reference numerals refer to similar elements and in which.

DESCRIPTION OF PREFERRED EMBODIMENTS

Embodiments as described herein are directed to a device and method to adjust automatically a supply current of a LED lighting system depending on a length thereof.

Figure 1:
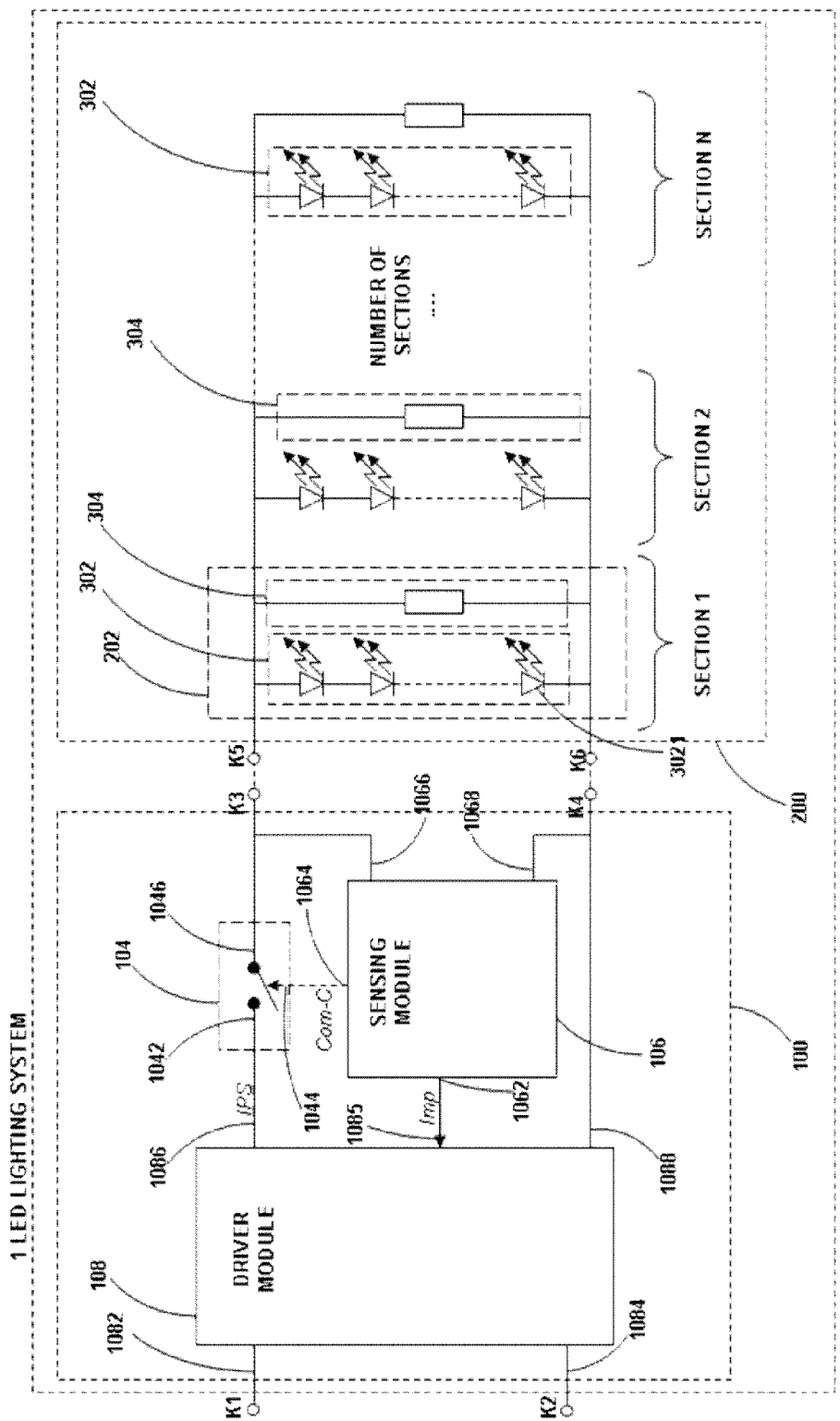
FIG. 1 is a simplified block diagram of a LED lighting system embodying the proposed solution.

Referring to FIG. 1, there is shown a simplified block diagram of the LED lighting system, to which embodiments of the invention can be applied. LED lighting system 1 comprises a power supply module 100 for supplying a power supply current to a LED strip 200.

The exemplary power supply module 100 as shown may include input terminals K1 and K2 for receiving a power voltage from a power supply voltage, output terminals K3 and K4 for supplying the power supply current to the LED strip 200, a driver module 108, a Switch 104, and a sensing module 106. The LED strip 200 comprises for instance a plurality of LED modules 202 connected in parallel one with each other between first and second input terminals K5 and K6, respectively.

In one embodiment of the invention, two input terminals K1 and K2 of the power supply circuit 100 can be connected to inputs 1082, 1084 of the driver module 108. The driver module 108 comprises two inputs 1082 and 1084 for receiving the power supply voltage through the two input terminals K1 and K2 of the power supply circuit 100, and two output terminals 1086, 1088. A first output terminal 1086 of the driver module 108 is adapted to provide the power supply current designated as IPS in the following description and drawings and is connected to a first terminal 1042 of the switch 104. A second output terminal 1088 of the driver module 108 is connected to the second output terminal K4 of power supply module 100. The driver module 108 may also include a third input 1085 adapted to receive an impedance information signal, hereinafter designated as Imp, from an output of the sensing module 106. The driver module 108 can be a programmable circuit e.g., a microcontroller circuit or any other type of electronic circuit, for instance an integrated circuit such as a FPGA (Field Programmable Gate Array) circuit able to implement a calculation based on a defined strategy and to provide a supply current on its output.

The first terminal 1042 of the switch 104 is adapted to receive the power supply current IPS from the first output terminal 1086 of the driver module 108. It further comprises a second input 1044 adapted to receive a command signal designated as Com_C from the sensing module 106 thus allowing driving the state (open or closed) of the switch 104. The switch 104 further comprises a second terminal 1046 connected to the first output terminal K3 of the power supply module 100 and adapted to transmit the power current supply IPS from the first output terminal 1086 of the driver module 108 through the input 1042 of the switch 104. The switch 104 can be formed by a transistor e.g., a MOS (Metal Oxide Semiconductor) transistor or a Bipolar transistor used in commutation mode or another type of components or circuits able to perform a switch function.

The sensing module 106 is adapted to measure the impedance of the LED strip 200 and comprises two inputs 1066, 1068 and two outputs 1062, 1064. The two inputs 1066 and 1068 of the sensing module 106 are connected to the two output terminals K3, K4 of the power supply circuit 100 and allow the measurement of the impedance of the LED strip 200 by the sensing module 106. The sensing module 106 comprises a first output 1062 coupled to the third input 1085 of the driver module 108 and adapted to provide a signal representative of the impedance of the LED strip module 200.

The sensing module 106 comprises a second output 1064 adapted to provide a command signal designated as Com_C to control the state of switch 104; the command signal Com_C allows rendering said switch 104 alternatively non conductive during a first time interval and conductive during a second time interval. The sensing module 106 can be a programmable circuit for instance, a FPGA (Field Programmable Gate Array circuit) or another type of electronic circuit e.g., a microcontroller able to measure impedance, drive a switch and perform calculation according to a defined strategy.

The first and second input terminals K5 and K6 of the LED strip 200 allow the power supply current IPS to flow when they are connected to the two output terminals K3 and K4, respectively, of the power supply circuit 100.

The LED strip 200 comprises a plurality of LED modules 202 connected in parallel one to the other. In one embodiment, the number of LED modules 202 defines the length of the LED strip 200. The LED module 202 comprises a LED string structure 302 and an elementary impedance module 304 connected in parallel with the LED string structure 302.

The LED string structure 302 may comprise a plurality of LED components 3021 connected in series on, for example, a flexible printed circuit within a silicone slab, and allowing generating a plurality of light beams when they are powered on. In a possible embodiment, the LED string structure 302 may comprise 12 elementary LED components connected in series for a 48-Volt supply voltage. The LEDs can be connected on any suitable substrate depending on the application, be it flexible or not. It will be appreciated, indeed, that the invention is not intended to be limited by the technology of the luminaire. Also, it is not intended to be limited by the length of the luminaire, which is related to the number of LED modules 202.

The impedance module 304 may comprise high ohmic impedance connected in parallel with the LED module 202. The impedance value of the impedance module 304 is chosen so that, when the LED components 3021 of the LED string structure 302 are powered on for emitting light beams, the total impedance of all LED components 3021 is significantly smaller than the impedance of the impedance module 304. The supply current generated by the power supply circuit 100 is allowed to flow in the LED string structure 302 only. The elementary impedance modules 304 can comprise a resistive element, such as a resistor or a plurality of resistors, allowing obtaining a high value of the total impedance, or any other type of components, for instance capacitor or inductor components, or any combination thereof depending on the application.

The operation of the LED lighting system 1 shown in FIG. 1 is as follows assuming that the input terminals K1 and K2 of the power supply circuit 100 are connected to a power supply source, and the two output terminals K3 and K4 of the power supply circuit 100 are connected to input terminals K5 and K6 of the LED string module 200.

As described above, the sensing module 106 alternatively renders the switch 104 non conductive during a first time interval and conductive during a second time interval.

Figure 2:
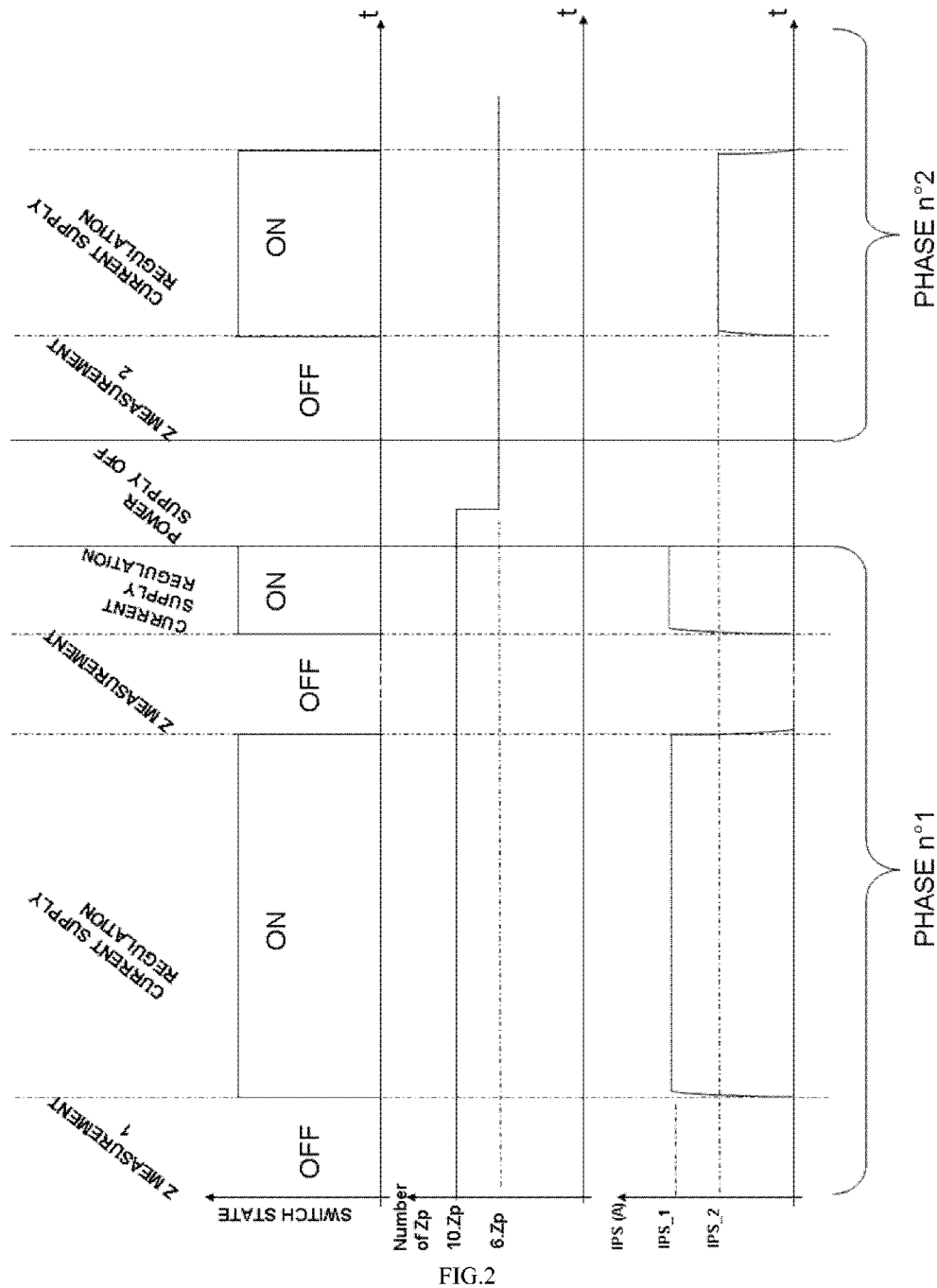
FIG. 2 is a typical control current sequence of the invention according to the embodiments.

FIG. 2 shows an example of a shape of the power supply current IPS from the first output terminal 1086 of the driver module 108, where the first time interval corresponds for example to an impedance measurement step labelled "Z MEASUREMENT" in the graph of FIG. 2, and the second interval time corresponds to a current supply step labelled "CURRENT SUPPLY REGULATION". The duration of the first step (impedance measurement) is smaller than the duration of the second step, and for instance the ratio can be approximately 10 between the duration of the first step and the duration of the second step.

In order to illustrate the power current regulation sequence according to proposed embodiments, the timing diagram of FIG. 2 is divided in two phases of operation: a first phase where the number of elementary impedance modules 304 is equal to ten and a second phase where the number of elementary impedance modules 304 is equal to six. Such a change may happen, for instance, when a user cuts the flexible luminaire to the desired length. Further, it is noted that the cutting of the flexible luminaire is preferably performed when the power supply is off.

Further, the phases described above may be divided in two main steps of operation such as a measurement step allowing measuring the total impedance of the LED strip 200, the measurement step being labelled as "Z MEASUREMENT" in FIG. 2, and a regulation step which enables to provide the supply current to the LED strip 200, the regulation step being labelled as "SUPPLY CURRENT REGULATION" in FIG. 2. It will be appreciated that Zp (i.e., the impedance value of the impedance module 304) and power supply current IPS values as shown in the diagrams are examples arbitrarily chosen to illustrate the present description, and are not intended to limit the scope of the described embodiments.

During the regulation steps, the switch 104 is controlled so as to be conductive, i.e., in the ON state, and the power supply current ICP generated by the driver module 108 is supplied to the LED strip 200, thus allowing generating light beams. During the measurement steps, the switch 104 is controlled so as to be non conductive, i.e., in the OFF state, and thus the power supply current ICP is not supplied to the LED strip 200. Further, it will be noted by the one with ordinary skills in the art that the magnitude of the voltage generated by the sensing module 106 for the impedance measurement step may be adequately large enough for allowing an impedance measurement of the LED strip module 200, and low enough to keep the LED component 3021 in a non conductive state.

In the first measurement step labelled "Z MEASUREMENT 1" on FIG. 2, the second output 1064 of the sensing module 106 provides a signal able to commutate the switch 104 in OFF state. In this state of the switch 104, the sensing module 106 measures the value of the impedance of the whole LED strip 200. The value of this total impedance depends on the number of LED modules 202 in the LED strip 200. In the example considered below, for instance, the number of LED modules 202 is ten, the value of the total impedance is then:

$$\frac{1}{Zp \text{ (total)}} = \left[\left(\frac{1}{Zp1}\right)+\left(\frac{1}{Zp2}\right)+\left(\frac{1}{Zp3}\right)+\ldots+\left(\frac{1}{Zp(n)}\right)\right] \quad (1)$$

where:
Zp(n) is the impedance of the impedance module number n.
The measured impedance value, or else directly the number of elementary impedance modules 304 of the LED strip 200 is then transmitted to the driver module 108 from the first output 1062 of the sensing module 106.

The driver module 108 is adapted to operate according to any suitable strategy for calculating the power current in response to the measurement value of e.g. ten impedance modules 304 connected in parallel of the LED strip 200. In possible embodiments the determination of the power current can be performed by using a table with predetermined currents and impedances values. In a variant, it may be performed by using a mathematical formula, for instance. After calculation, the first output terminal 1086 of the driver module 108 provides a signal representative of the number of LED modules 202 of the LED strip 200, for example a current designated as IPS_1 with a value corresponding to the number of LED modules 202 of the LED strip 200.

At the beginning of the second step, the second output 1064 of the sensing module 106 provides a signal able to commutate the switch 104 in ON state. The power current supply from the first output terminal 1086 of the driver module 108 is provided to the LED strip 200 in accordance with the number of the LED modules 202. These steps can be carried out in a cyclic manner.

When the power supply is off, the number of LED modules 202 can be modified. After this modification, when the power supply is on, at the beginning of a second phase designated as "phase n°2" in FIG. 2, the sensing module 106 detects an impedance variation during the next impedance measurement step after the modification of the impedance of the LED module 202. For instance, when the number of impedance modules 304 is reduced to six, then the new value of the impedance is provided to the third input 1085 of the driver module 108 in accordance with this modification. The driver module 108 thus calculates the new value of a new supply current IPS_2 and provides the new power supply current IPS_2 on the first output terminal 1086. When the second output 1064 of the sensing module 106 generates a signal for commuting the switch 104 in the ON state, then the new power supply current IPS_2 is provided to the inputs of the LED strip 200.

In other embodiments of the invention, the supply current regulation can be performed when the power supply is on if a user cuts a small section of the LED strip 200 at a time.

While the invention has been illustrated and described in details in the drawings and foregoing description, such illustration and description have to be considered as illustrative or exemplary and not restrictive; the invention is not limited to the disclosed embodiments. Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The invention claimed is:
1. A Light Emitting Diode lighting system comprising:
a LED strip comprising a plurality of LED modules connected in parallel, each LED module comprising:
a LED string structure comprising a plurality of LED components connected in series,
an impedance module connected in parallel with the LED string structure, a driver module having an output adapted to provide a power supply current for supplying the LED strip, a switch, having a first terminal coupled to the driver module and a second terminal coupled to the LED strip, a sensing module adapted to control the switch, and to measure a total impedance of the LED strip when the switch is open, and having an output adapted to provide an output signal representative of the total impedance of the LED strip, wherein the driver module further has an input adapted to receive the output signal from the sensing module, and is adapted to control the power supply current by the output of the driver module as a function of the output signal provided by the output of the sensing module.

2. LED Lighting system as claimed in claim 1, wherein the LEDs components are arranged on a flexible slab.

3. LED Lighting system as claimed in claim 2, wherein the flexible slab is made of silicone.

4. LED Lighting system as claimed in claim 1, wherein the impedance module comprises at least one resistive element.

5. LED Lighting system as claimed in claim 1, wherein the impedance module comprises at least one element among the group consisting of a resistor, a capacitor or an inductor.

6. A method of supplying power to a LED lighting system comprising a plurality of LED modules connected in parallel forming a LED strip wherein each LED module comprising a LED string structure comprising a plurality of LED components connected in series, and an impedance module connected in parallel with the LED string structure, wherein the LED strip is cutable to a desired length said method comprising at least:

measuring the total impedance of the LED strip when a switch having a first terminal coupled to a driver module and a second terminal coupled to the LED strip is open, providing an output signal representative of the total impedance of the LED strip, receiving at the driver module the output signal from the sensing module, and controlling at the driver module a power supply current to the LED strip as a function of the total impedance measured during the measurement step, the total impedance being dependent on said desired length.

7. The method of claim 6, wherein the measurement steps sets the switch in the open state during the measurement step.

8. The method of claim 6, wherein the step of controlling sets the switch in module in the closed state during the step of controlling the power supply current to the LED strip.

* * * * *